(12) United States Patent
Price

(10) Patent No.: US 9,088,823 B1
(45) Date of Patent: Jul. 21, 2015

(54) CUSTOMIZED INSERTIONS INTO DIGITAL ITEMS

(75) Inventor: Roy F. Price, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 471 days.

(21) Appl. No.: 13/098,238

(22) Filed: Apr. 29, 2011

(51) Int. Cl.
| | | |
|---|---|---|
| *H04N 7/10* | (2006.01) | |
| *H04N 7/025* | (2006.01) | |
| *H04H 60/32* | (2008.01) | |
| *H04N 21/458* | (2011.01) | |
| *H04N 21/466* | (2011.01) | |

(52) U.S. Cl.
CPC ......... *H04N 21/458* (2013.01); *H04N 21/4661* (2013.01); *H04N 21/4667* (2013.01)

(58) Field of Classification Search
None
See application file for complete search history.

(56) References Cited

U.S. PATENT DOCUMENTS

| | | | | |
|---|---|---|---|---|
| 8,079,054 | B1* | 12/2011 | Dhawan et al. | 725/105 |
| 2003/0037333 | A1* | 2/2003 | Ghashghai et al. | 725/46 |
| 2005/0086692 | A1* | 4/2005 | Dudkiewicz et al. | 725/46 |
| 2005/0132401 | A1* | 6/2005 | Boccon-Gibod et al. | 725/34 |
| 2006/0227125 | A1* | 10/2006 | Wong et al. | 345/211 |
| 2008/0307454 | A1* | 12/2008 | Ahanger et al. | 725/36 |
| 2009/0228920 | A1* | 9/2009 | Tom et al. | 725/35 |
| 2009/0254932 | A1* | 10/2009 | Wang et al. | 725/14 |
| 2010/0050202 | A1* | 2/2010 | Kandekar et al. | 725/14 |
| 2010/0186026 | A1* | 7/2010 | Lee et al. | 725/14 |
| 2012/0084809 | A1* | 4/2012 | Schultz | 725/34 |
| 2012/0278828 | A1* | 11/2012 | Yazdani et al. | 725/19 |
| 2013/0247080 | A1* | 9/2013 | Vinson et al. | 725/14 |

* cited by examiner

*Primary Examiner* — Nathan Flynn
*Assistant Examiner* — William J Kim
(74) *Attorney, Agent, or Firm* — Lee & Hayes, PLLC

(57) ABSTRACT

Digital content items may include additional content such as advertisements. Placement of the additional content may be based on a characteristic of the digital content item and/or a characteristic of a consumer of the digital content item. In one implementation, a level of interest is determined for multiple time points in a digital content item and an advertisement is located in the digital item based on the level of interest.

19 Claims, 8 Drawing Sheets

CUSTOMIZED INSERTIONS INTO DIGITAL ITEMS

BACKGROUND

Content developers, producers, publishers, distributors and the like seek to generate revenue from content items. Revenue can be generated by charging for consumption of content items such as by selling a music album or a book. Revenue can also be generated by charging advertisers to place advertisements in content items. Broadcast television is one example of generating revenue through advertisements. A combination of advertisements and payment by consumers, such as in a newspaper or cable television, is also possible. With the spread of personal computers and the Internet, many different types of content items are now available as digital content items. Digital content items may be more malleable than analog content items, allowing for greater flexibility in inserting advertisements or other additional content.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
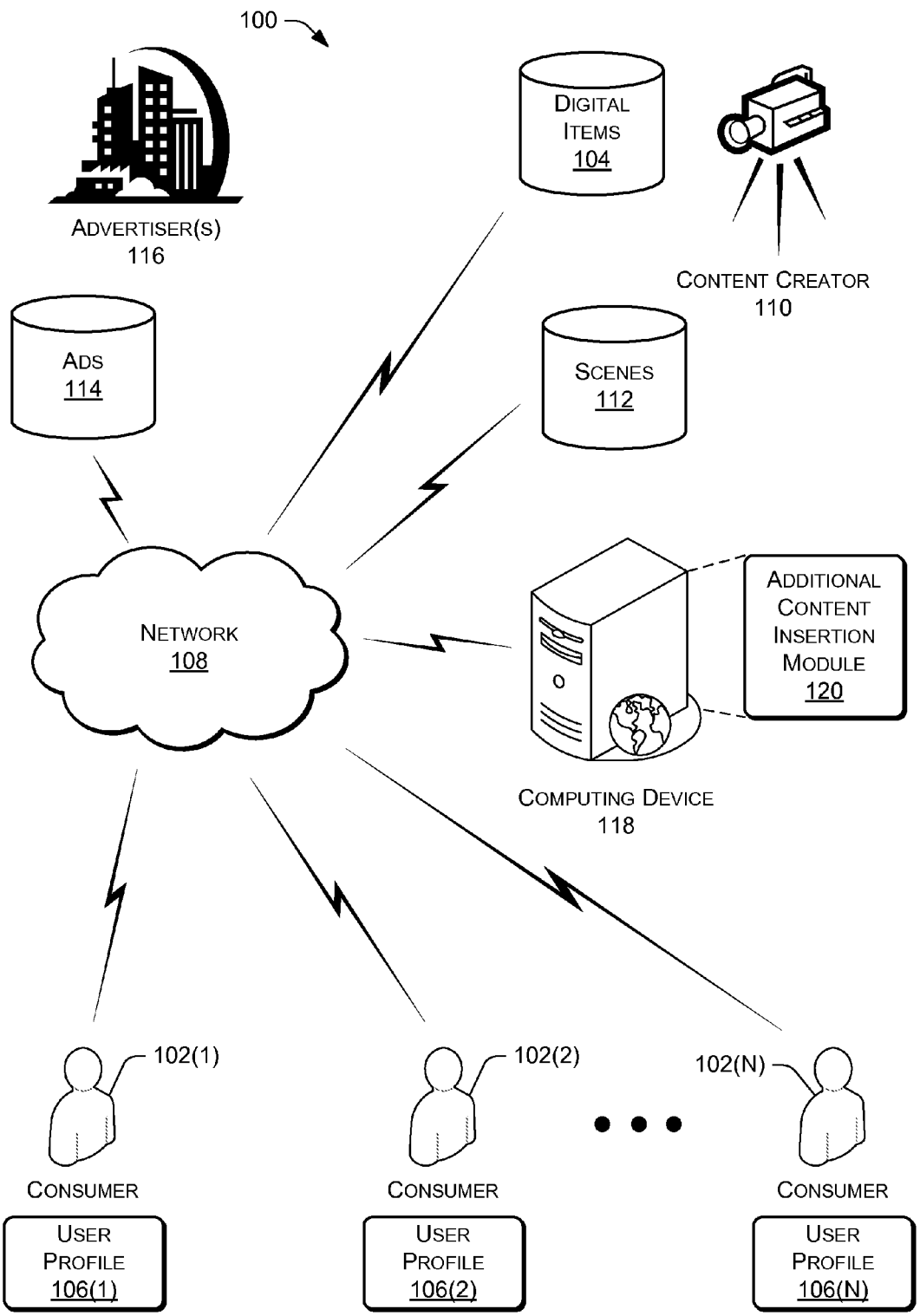
FIG. 1 is a schematic diagram of an example architecture that includes a plurality of consumers of digital items. A content creator creates the digital items and an advertiser supplies advertisements. A computing device facilitates inserting content into the digital items enabling the consumers to consume the modified digital items.

This disclosure describes, in part, techniques for determining a location to place additional content (e.g., advertisements) into digital content items. This disclosure also describes, in further part, techniques for selecting additional content to insert in a digital item based on a characteristic of a consumer of the digital item and/or other characteristics.

Traditionally, advertisements detract from the experience of those who consume a digital item such as a television show or a web page. Most people dislike encountering advertisements, but some level of advertising may be necessary to pay for creation of digital items. The strongest negative reactions to advertisements include abandoning the digital item by, for example, turning off the television or browsing to a different website. Intelligent placement of advertisements can reduce negative responses.

Digital items such as movies, music, eBooks, web pages, computer games, and the like may exist in multiple versions and may be customized for individual consumers. The likelihood that a consumer (e.g., viewer, listener, reader, player, etc.) will continue to consume the digital item after being presented with an advertisement may depend on how interested the consumer is in the digital item. Specifically, the portion of the digital item preceding the advertisement may determine the interest level of the consumer in the digital item when the advertisement appears.

Strategic placement of advertisements within digital items may minimize negative reactions to the advertisements. Strategies for placing an advertisement may be based on the digital item, characteristics of a consumer of the digital item, a characteristic of the advertisement itself, or other factors. In one implementation, advertisements may be inserted near a portion of the digital item that is most interesting to consumers. For example, an advertisement may be placed shortly before or shortly after a climactic moment in a movie. At this point, the consumers are likely to be highly interested in the movie and more willing to endure an advertisement without abandoning consumption of the movie. Similarly, advertisements may be placed in a temporal flow of a digital item before revelation of a significant plot element. For example, an advertisement may be inserted into a murder-mystery eBook before the page that reveals the identity of the killer.

Characteristics of an individual consumer or of a class of consumers may also direct placement of an advertisement. A certain consumer or consumers with a certain profile may tend to prefer advertisements at different times during the temporal flow of a digital item. For example, some people may wish to see advertisements towards the beginning of the digital item while others may wish to see advertisements near or at the end of the digital item. Additionally, individual preferences may include a desired advertisement frequency such as equal spacing throughout the digital item, one advertisement every 30 minutes during a long movie, placement of advertisements in the middle of the digital item to maximize the length of uninterrupted segments, and the like. Many other arrangements are possible and the preferred arrangement for a particular content consumer may be determined based on past viewing behavior, explicit indications provided by the consumer, analogies to preferences by other consumers having similar characteristics, and the like.

The nature of the advertisement may also be used to choose a location in which to insert the digital item. The objectives for various advertisements may be different. Some advertisements, such as those presented on a device that allows user interaction with advertisements, may be designed to encourage a consumer to "click" or otherwise interact with advertisement perhaps to be taken to a website associated with the advertiser. Other types of advertisements may be intended to create an "impression" with the consumer in order to, for example, keep a brand name in the consumer's mind. Advertisements focused on creating impressions may not necessarily seek user interaction with the advertisement. Advertisements that are designed to generate impressions may be placed in locations in the temporal flow of a digital item that are less susceptible to consumer drop-off (e.g., the most interesting parts of the digital item). However, consumers may be less likely to interact with an advertisement during the most interesting segments of a digital item, so advertisements that are designed to receive user interaction may be placed at the end of the digital item, at logical transition points within the digital item (e.g., between songs on a album, between chapters in an e-book, etc.), and the like.

Additional content beyond advertisements may also be inserted into digital items. For example, deleted scenes from a movie may be inserted back into the movie at the point for which the scene was deleted rather than included as an extra feature at the end of the movie. Individual consumer preference may control whether and which deleted scenes are inserted into a digital item. For example, some consumers may have a preference to see all deleted scenes, where others may wish to see a "theatrical version" of a movie. A given consumer may also specify a time requirement that is used by the system to identify how many deleted scenes to include. For example, the consumer could indicate that he or she wishes to see deleted scenes so long as the total length of the digital item is less than two hours.

More sophisticated selection of deleted scenes may be implemented by comparing known consumer preferences with features of a particular deleted scene. For example, a deleted scene may be tagged or otherwise designated as an action sequence and this deleted scene may be inserted in a digital item for those consumers that have expressed an interest in action scenes. Similarly, a scene of dialogue may be added for those consumers that have an interest in dramatic content. Thus, selective insertion of different additional digital items may allow consumers to each consume a personalized version of the digital item.

Deleted scenes may be generally thought of as content that is optional and could be omitted without significant detriment to the digital item. The authors, editors, or other content creators may feel that other portions of the digital item are necessary for plot development, to express the desired artistic intention, or for other reasons. However, the content creators may create multiple or alternate versions of content that could be substituted for each other. Thus, these "alternate scenes" may be two or more scenes one of which will be included in the digital item based on any number of factors such as consumer characteristics. For example, a scene from a movie may include one version in which the characters are smoking cigarettes and in other version in which the characters are not smoking. User characteristics, such as age, tobacco use, etc. may determine which of these two alternate scenes is selected and inserted into the movie. As a further example, a song may have explicit lyrics and the portions of the song with the explicit lyrics may have alternate versions with different lyrics. Thus, age of the consumer, a rating preference, or other characteristics may be used to determine whether the explicitly option or the alternative lyric option segments are inserted into the song.

Deleted scenes or alternate scenes may also be combined with advertisements in numerous ways such as by product placement. For example, a scene from a television program may show a can of soda sitting on a table. Alternate scenes may show that can of soda as being a generic product without branding or as one of a number of specific brands of soda. The selection of which, if any, brand of soda to use in the scene may be based on advertiser payments. The alternate scene that is inserted may show the product of the soda company that paid the highest amount for the advertising. Unlike product placement in a static digital item, the alternate scenes may be frequently changed so a consumer may see a different can of soda sitting on the table each time he or she views the television program. Similarly, deleted scenes may be used to add in an additional content segment that features a specific product or other advertiser message. These types of deleted scenes may be included if the advertiser pays for insertion.

Deleted scenes or alternate scenes may only make sense to insert in a predetermined location in a digital item (i.e., inserting a deleted scene into a movie other than where that scene fits in to the flow of the narrative would be disruptive and confusing to the consumer). However, advertisements and other types of additional content may be inserted in any location within the digital item including immediately before and immediately after the digital item. Selection of where to insert additional content such as advertisements may be based on interest levels throughout the digital item as discussed above or on consumer feedback.

Consumer feedback and preferences can be collected both on an individual level as part of a consumer's profile or on an aggregate level by observing multiple consumers of digital items. Positive feedback may be as simple as an observation that the user consumes the entire digital item. Thus, not abandoning a digital item in spite of advertisements may be interpreted as a good thing from the perspective of the advertisers. Negative feedback can include wholesale abandonment of the digital item or expressions of disinterest. If a consumer is consuming a digital item on a multifunction computing device, such as a personal computer, different types of user interaction with the device may be interpreted as negative feedback. For example, if the consumer starts to interact with a different web page while watching a streaming video that interaction may be interpreted as indicating that the consumer has lost interest or is having a negative response to a particular portion of the video. If this and other types of negative responses tend to correlate with advertisements, various manipulations of advertisement placement may be attempted to minimize the negative responses.

Consumer authorization is received before collecting data about consumption behavior in order to protect privacy and allow consumers to control how much information is shared. Consumers may be motivated to share this information in order to benefit by receiving advertisements placed in locations that are least objectionable.

Consumers may also be provided with the option of accessing a digital item having fewer or zero advertisements if the consumer pays for the digital item. For example, a content producer could determine that revenue of $0.99 is needed for each instance a digital item is consumed and offer the consumer the digital item without advertisements for a $0.99 or with a reduced number of the advertisements if the consumer pays $0.49.

Some indications of disinterest or negative feedback may be difficult to observe particularly if the consumer is in a remote location accessing the digital item over a network. For example, a user who is listening to an audio book that includes advertisements may not change interactions with the device playing the audio book, but may start browsing through a magazine and mentally "tune out" the advertisements included in the audio book. This type negative feedback may not be captured simply by observing interactions with the audio book player device.

Thus, explicit consumer feedback about advertisement placement may be used in addition to or instead of observed, indirect feedback. In some implementations, the consumer may have access to a user interface elements such as a thumbs-up/thumbs down button or a slider bar with 0 to 5 rankings in order to rate positive or negative experiences with an advertisement.

All of the positive and negative user feedback gained through both observation and explicit feedback from the consumer may be aggregated as part of a profile for the consumer. The feedback may also be aggregated for a given digital item across multiple consumers to identify which locations consumers as a group tend to prefer or dislike advertisements.

The following architectures, devices, process flows, etc. provide but a few illustrative techniques for implementing the insertion of additional content discussed above. Other architectures, devices, and processes may also be used to implement the functionalities presented in this disclosure.

Example Architecture

FIG. 1 is a schematic diagram of an example architecture 100 that includes one or more consumers 102(1), 102(2), . . . , 102(N) who may consume digital items 104 (e.g., movies, televisions shows, music, eBooks, video games, etc.). Each of the consumers 102 may be associated with a user profile 106(1), 106(2), . . . , 106(N) that may include characteristics about the consumer 102 such as advertising preferences, content preferences, past consumption behavior, past purchase or shopping behavior, as well as other characteristics such as a user name, age, geographic location, etc.

Each of the consumers 102 may receive access to the digital items 104 through a network 108 which may represent any one or combination of multiple different types of networks, such as cable networks, the Internet, private intranets, wireless networks, and the like. The digital items 104 may be created by a content creator 110 (e.g., a movie studio, an eBook author, a video game designer, etc.). The content creator 110 may additionally create one or more scenes 112 associated with one of the digital items 104. The association between a scene 112 and a digital item 104 may include a specific indication of a time point in the digital item 104 at which the scene 112 is to be inserted. For example, a given deleted scene from a movie, if inserted into that movie, is inserted 37 minutes and 12 seconds after the start of the movie. The scenes 112 may include deleted scenes that can be optionally inserted into one of the digital items 104 or alternative scenes from which one of multiple scenes is selected for insertion into one of the digital items 104.

The digital items 104 may also be modified to include advertisements 114 from one or more advertisers 116. The advertisements 114 may be produced by the advertisers 116 without association with any particular digital item 104. The same advertisement 114 may be inserted in multiple different digital items 104 or multiple times within the same digital item 104.

Thus, the architecture 100 illustrates digital items 104 which may include scenes 112 and/or advertisements 114. The logic or algorithms used to decide which scenes 112 and/or advertisements 114 are inserted into a digital item 104 may be implemented by a computing device 118 utilizing an additional content insertion module 120. The computing device 118 may be any sort of computing device, such as a network server, a personal computer, a personal digital assistant (PDA), a laptop computer, a mobile phone, a set-top box, a game console, an electronic book reader, and so forth. The computing device 118 may also represent a plurality of computing devices connected together in a peer-to-peer, mesh, ad hoc, or other type of distributed computing architecture.

The additional content insertion module 120 may identify, either functioning alone or in conjunction with other modules, which scenes 112 and/or advertisements 114 to insert into a digital item 104. For advertisements 114 that may be inserted at multiple points within the digital item 104, the additional content insertion module 120 may also determine where to insert the advertisements 114. Insertion of additional content into a digital item 104 may be based on any one or combination of a characteristic of a consumer 102, a characteristic of the digital item 104, a payment from the advertiser 116, and other factors.

The digital item 104 including any additional content is ultimately provided to one or more of the consumers 102 for consumption (e.g., viewing, reading, playing, etc.). In some implementations, feedback from the consumers 102 during or following consumption of the digital item 104 may be provided to the computing device 118. The feedback may be used to further refine the logic or algorithms for placing advertisements 114, scenes 112, or other additional content.

Example Representations of a Digital Item

Figure 2:
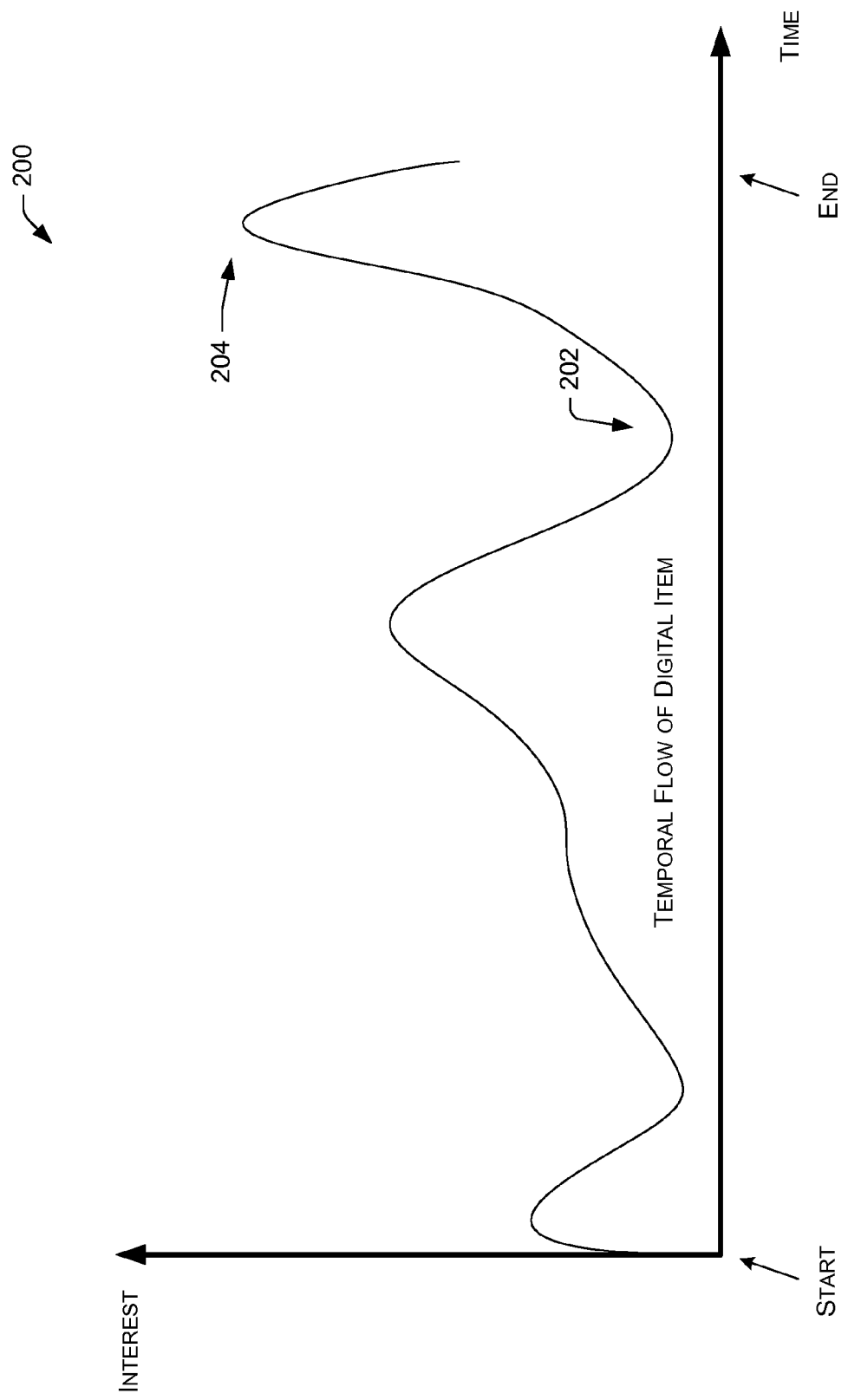
FIG. 2 is a graph of an interest level varying across a temporal flow of a digital item.
Figure 3:
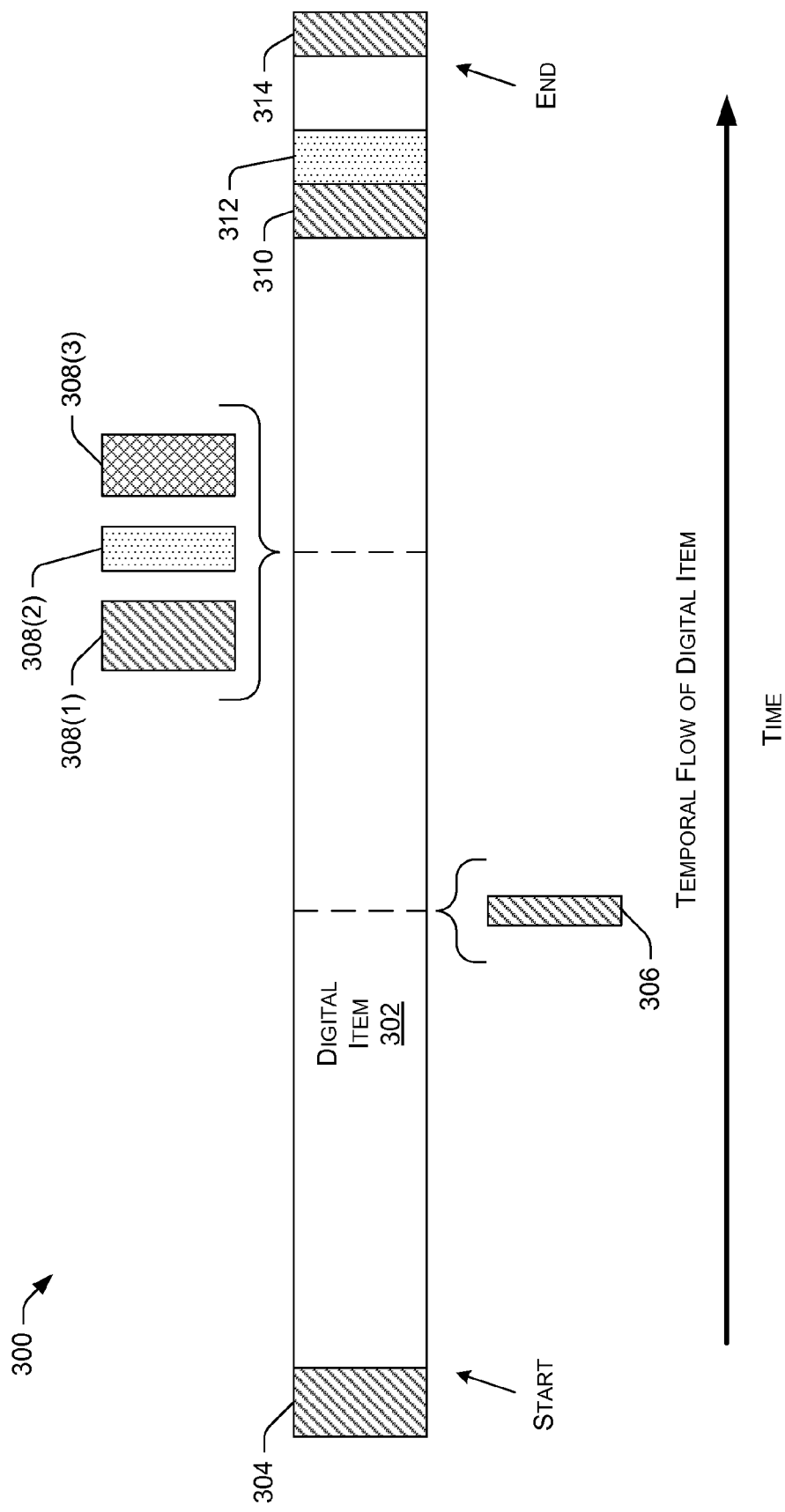
FIG. 3 is a representation of a digital item that includes additional content items and also has locations for insertion of further additional content items.
Figure 4:
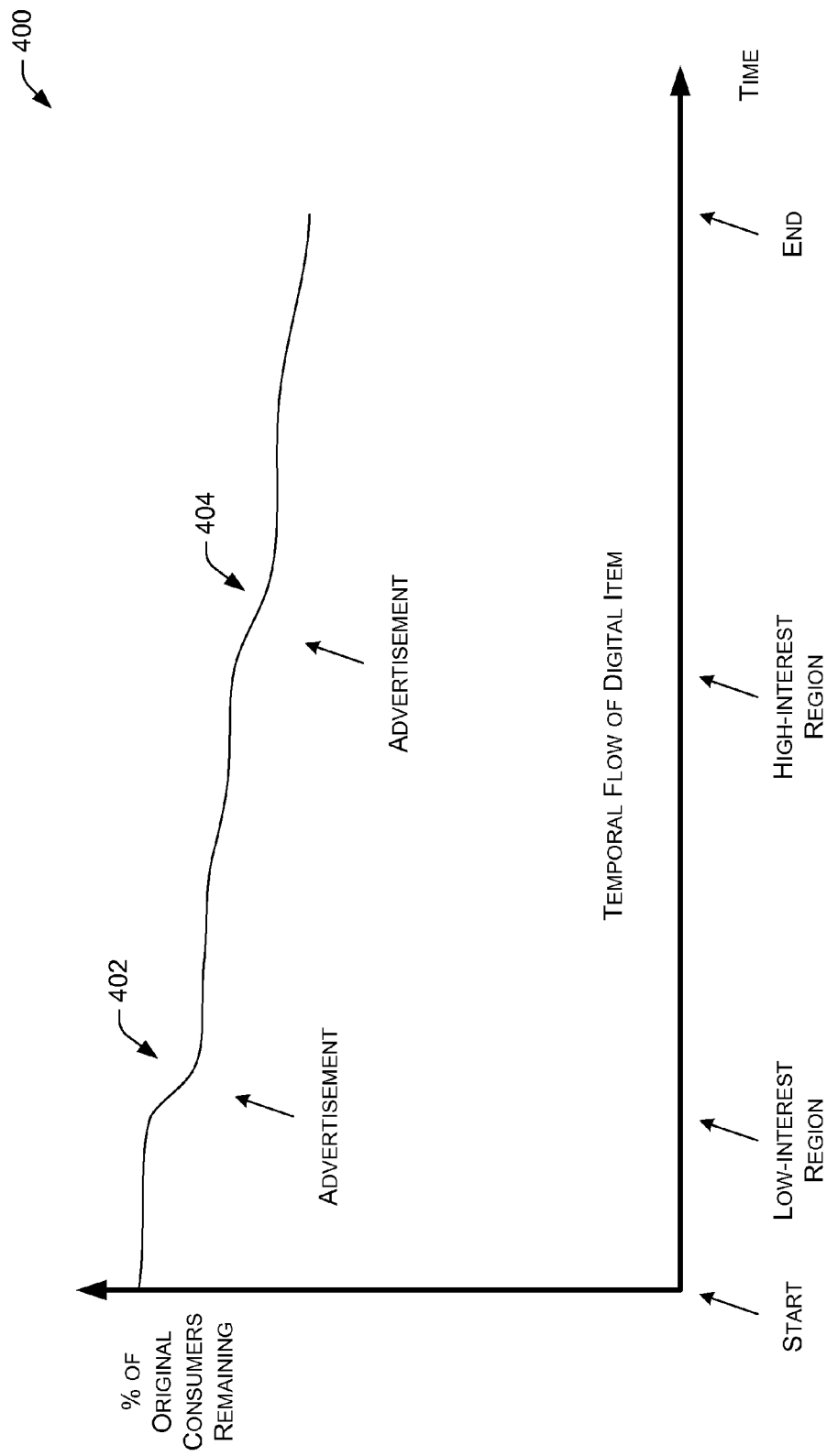
FIG. 4 is a graph of consumer attrition during the temporal flow of the digital item in response to advertisements and relative levels of interest across the temporal flow of the digital item.

The following figures show illustrative representations of a digital item representing the level of consumer interest in the digital item in FIG. 2, locations of additional content items inserted into the digital item in FIG. 3, and attrition or consumer drop-off during the duration of the digital item in FIG. 4. In each of these representations the digital item has a start and an end. The existence of a start and an end as well as the directionality of consumption of the digital item, specifically going from the start to the end, creates a temporal flow for the content of the digital item. For digital items that include video or audio content the temporal flow may be tracked in units of time such as seconds and minutes. Digital items that consist primarily of text such as eBooks also have a temporal flow represented by the order of pages, words, or characters from the beginning until the end of the eBook.

FIG. 2 is a graph 200 of user interest throughout the temporal flow of a digital item. The graph 200 shows interest in the digital item starting low and having various peaks and valleys representing relatively more interesting and relatively less interesting portions of the digital item. One region of lower interest 202 is shown about three quarters of the way through the temporal flow of the digital item. Another region of high interest 204 is shown near the end of the digital item. The region of high interest 204 may correspond to climax near the end of a dramatic story and also be the point of highest interest anywhere within the temporal flow of the digital item.

The representation of relative levels of interest across the temporal flow of the digital item may be based on feedback from a single consumer or aggregate feedback from multiple consumers. When multiple consumers express different levels of interest in the same portion of the digital item, a median, mean, or other metric derived from the different levels of user interest may be assigned to that portion of the digital item.

In some implementations, consumers may directly indicate the level of interest while consuming the digital item by providing real-time feedback. For example, one or more consumers watching a video may express a level of interest by rotating a dial up or down, moving a slider bar, entering a number (e.g., 0-10) or otherwise generating some type of input that correlates with interest. Levels of interest may also be observed by monitoring physiological attributes of consumers that correlate with interest. For example, a consumer may be observed with an eye tracker (e.g., measuring how intently the consumer watches the digital item, change in blink rate, etc.), a pulse rate monitor, a respiration monitor, a facial thermograph, and the like during consumption of the digital item.

Consumer interactions with a computing device, which may be the same device that is presenting the digital item for consumption, may provide implicit indicia of interest in the digital item. Actions that suggest the consumer's attention is focused somewhere other than on the digital item may be interpreted as indicating that the currently presented portion of the digital item is of relatively lower interest to the consumer. For example, increasing a frequency of input device activity (e.g., typing or moving a mouse) while consuming a digital item may be interpreted as correlated with decreasing interest. Additionally, if the digital item is presented in a user interface that has multiple windows or other options for focusing the consumer's attention, making a window other than the one containing the digital item the "active" window may be another indication of decreased interest. Similarly, minimizing the display size of a video image by shrinking a window in a graphical user interface (GUI) or viewing the digital item in the small window of a picture-in-picture display of a television may suggest a lower level of interest in the digital item.

Pausing and then restarting consumption of the digital item may also indicate that the consumer's interest in the digital item has momentarily waned, thus he or she chose that particular point to pause. Ceasing to scroll ahead or turn pages during consumption of an eBook may also be interpreted as the consumer "pausing" consumption of the eBook. Stopping consumption and abandoning the digital item (i.e., not consuming the remainder of the digital item) is another, strong, indication of disinterest.

The level of interest shown on the graph 200 may be represented by any arbitrary scale such as from 0-100 with 0 being the lowest level of interest and 100 being the highest. Each individual indication of interest from multiple consumers may receive a different weighting representing a strength of interest or disinterest. For example, a slight increase in mouse activity on a part of the screen other than where the digital item is being presented may be weighted as a relatively weak indication of disinterest. However, abandoning consumption of the digital item may be a very strong and highly weighted indicia of disinterest. Thus, when generating aggregate interest values for across the temporal flow of the digital item both the number of consumers expressing some indicia of interest or disinterest and the strengths of those expressions can be considered. For example, each consumer that abandons consumption of the digital item may cause the interest value to decrease by 1 and each consumer and that moves the digital item to a background window the interest level may cause the interest value to decrease by 0.5. The numerical values and relative rankings provided in this example are merely illustrative.

Thus, each point throughout the temporal flow of a digital item may be associated with an interest value and the interest values may be used to identify areas of relatively high interest 204 and areas of relatively low interest 202 within the digital item. The points of higher or lower interest within the digital item as well as the start and the end of the digital item may be used as referenced locations for the insertion of advertisements or other additional content. Although shown here as a graph, the correspondence of an interest value with a location in a digital item may be stored as a table or any other data structure.

FIG. 3 shows a schematic representation 300 of a temporal flow of a digital item 302 that starts on the left and ends on the right. The digital item 302 includes multiple portions of additional content as well as locations identified by dashed lines into which other additional content items may be inserted. The additional content may be an advertisement, a deleted scene, an alternate scene, or other type of additional content.

Insertion of additional content within the digital item 302 also includes inserting additional content at the start of the digital item 302 shown here by additional content 304. Some consumers may prefer to consume an advertisement prior to beginning consumption of the digital item 302. For example, if a certain number of advertisements are necessary to generate sufficient revenue to support creation of the digital item 302, the consumer may prefer to consume one or more advertisements at the beginning in order to later enjoy longer uninterrupted segments of the digital item 302. The additional content 304 may also represent a deleted scene such as a prologue that is inserted at the very beginning of the digital item 302.

Other additional content such as the additional content 306 may be available for insertion into the digital item 302, but not be inserted into a particular rendering of the digital item 302. For example, the additional content 306 may represent a deleted scene of a rating level that is inappropriate for the age of the consumer and therefore not included in the digital item 302. The dashed line above the additional content 306 represents that this additional content 306, if inserted, will be inserted at this predetermined location. The predetermined location may be determined by the creator of the digital item 302 such as by a director determining which scenes will be deleted and where the deleted scenes would be inserted if included in the digital item 302.

In some implementations, an advertiser may specify that a given advertisement is to be inserted only at a specified location such as shown here for the additional content 306. Within a given digital item, the advertiser may determine that insertion of an advertisement within a particular portion of the temporal flow of the digital item is desirable. For example, an advertiser who wishes to insert an advertisement for a sports car may choose to have the advertisement inserted immediately after a portion of a movie that shows a car chase scene. Thus, the location which an advertiser chooses to insert additional content 306 may be based on a contextual or logical relationship between the advertisement and the portion of the digital item 302 into which the advertisement is inserted.

Other portions of the digital item 302 may include predetermined locations for one of multiple additional content segments 308(1), 308(2), and 308(3). Here, one of the additional content segments 308(1), 308(2), or 308(3) may be inserted, thus the content segments are alternatives to each other. A greater or lesser number then three alternative content segments is also possible.

The additional content segment 308 may include one of three alternative scenes 308(1), 308(2), and 308(3). Each of the alternative scenes 308(1), 308(2), and 308(3) may correlate with a different content rating level such as G, PG-13, or R. Alternatively, the additional content segments 308 may represent an advertisement that could be targeted based on characteristics of a consumer of the digital item 302 such as an advertisement 308(1) targeted to people that live in coastal areas, a different advertisement 308(2) targeted to people that live near mountains, and a third advertisement 308(3) targeted to people that live on plains. The advertisements 308 may also be three versions of a scene that are similar but differ in product placement (e.g. 308(1), 308(2), and 308(3) each show a different brand of soda on a table).

Multiple additional content segments may be inserted adjacent to each other as shown by the insertion of additional content 310 and additional content 312. If the additional content is inserted at a predetermined location such as a deleted scene, then the content segments 310 and 312 may represent two deleted scenes that are adjacent to one another. A single scene may also be broken into sub-scenes to provide, for example, an extended version and an extra extended version of the digital item.

Multiple advertisements may be inserted as additional content adjacent to each other as represented by the content segments 310 and 312. The decision to insert two or more advertisements adjacent or separate from one another may be based on an advertising location preference of the consumer. Some consumers may prefer a longer block of advertisements with fewer interruptions throughout the digital item 302, whereas other consumers may prefer shorter periods of advertisement so that is possible to quickly resume consumption of the digital item 302. Advertisement placement such as the decision to place to advertisements adjacent to one another may also be based on the level of interest at that point in the temporal flow of the digital item 302. For example, at a location where it is less likely that consumers will have a negative reaction to advertisements (e.g., a point of high interest) multiple advertisements may be inserted next to one another.

Inserting an additional content segment 314 at the end is also considered insertion of additional content within the temporal flow of the digital item 302. After the consumer has finished consuming the digital item 302, he or she may be more likely to interact with an advertisement such as by clicking on a link to visit the advertiser's website, and thus, placement at the end of the digital item 302 may be preferable for certain types of advertisements.

However, advertisers may be concerned that the additional content segment 314 will be skipped by many consumers because there may be no incentive to consume the advertisement because the digital item 302 has ended. Thus, a price to purchase advertisement during the additional content segment 314 may be lower than purchasing advertisement at a different place in the temporal flow of the digital item 302. Additionally, in implementations where consumption of the digital item 302 and the additional content 314 may be tracked (e.g., streaming content from a server to a web browser), a percentage or number of consumers who actually consume an advertisement at the end of the digital item 302 may be used to determine a cost of advertising. Additionally, characteristics of particular consumers may indicate that certain consumers are more likely to consume advertisements at the end of a digital item, so these consumers may be more likely to receive digital items that have an advertisement placed at the end.

FIG. 4 shows a graph 400 of consumer attrition during the temporal flow of a digital item. The vertical axis represents the percent of the original consumers at the start of the digital item that remain and continue to consume the digital item during the length of the digital item. Thus, this value begins at 100% and decreases as consumers drop-off part way through consumption of the digital item. If there is a relatively large sample of consumers used to generate the graph 400, there may almost always be some degree of attrition even if the digital item does not include any advertisements. Therefore, a gradually decreasing line moving from left to right as the temporal flow of the digital item proceeds may be expected.

Inserting advertisements into the digital item may cause an increase in attrition. Insertion of any advertisement anywhere in the digital item may cause some increase in attrition. Therefore, intelligent placement of advertisements within the temporal flow of the digital item may seek to identify locations in which the advertisements have the least negative impact. Of course, there may also be some advertisements that consumers may find even more interesting than the digital item itself, and thus, those advertisements could show a decrease in consumer attrition. For these types of entertaining advertisements, the analysis and principles do not change rather placement is modified so as to have the greatest positive impact on consumer retention.

Identifying correlations or correspondence between consumer attrition and advertisement placement may be used to identify optimal locations for inserting advertisements into the digital item. In this illustration, there is a moderate increase in consumer attrition 402 when an advertisement is inserted near a low-interest region of the digital item. When an advertisement is inserted near a high-interest region of the digital item the decrease in consumer attrition 404 is smaller. Thus, it may be concluded that more consumers will abandon consumption of the digital item if an advertisement is inserted near a portion of the digital item which already holds a relatively lower interest for the consumers. Conversely, an advertisement inserted near a region of higher interest to consumers will not have as great of a negative impact.

Placement of advertisements may be based on the relative levels of interest across the digital item has shown in graph 400. However, placement of advertisements may also be based on distance from the start or end of the digital item. Characteristics of the consumers who are consuming the digital item. A genre or type of the digital item, a time of day when the digital item is being consumed, or any number of other factors. For example, analogies to other digital items may be used to identify locations for placing advertisements. If one popular music song was found to have minimal consumer attrition when an advertisement was inserted 30 seconds after the beginning of the song, other popular music songs may also be modified to include an advertisement after the first 30 seconds. Identification of possible correlations and modifying insertion locations of advertisements may allow for iterative improvements in consumer response so that advertisements are placed at a location that minimizes the negative impacts on consumer attrition.

Example Computing Device

Figure 5:
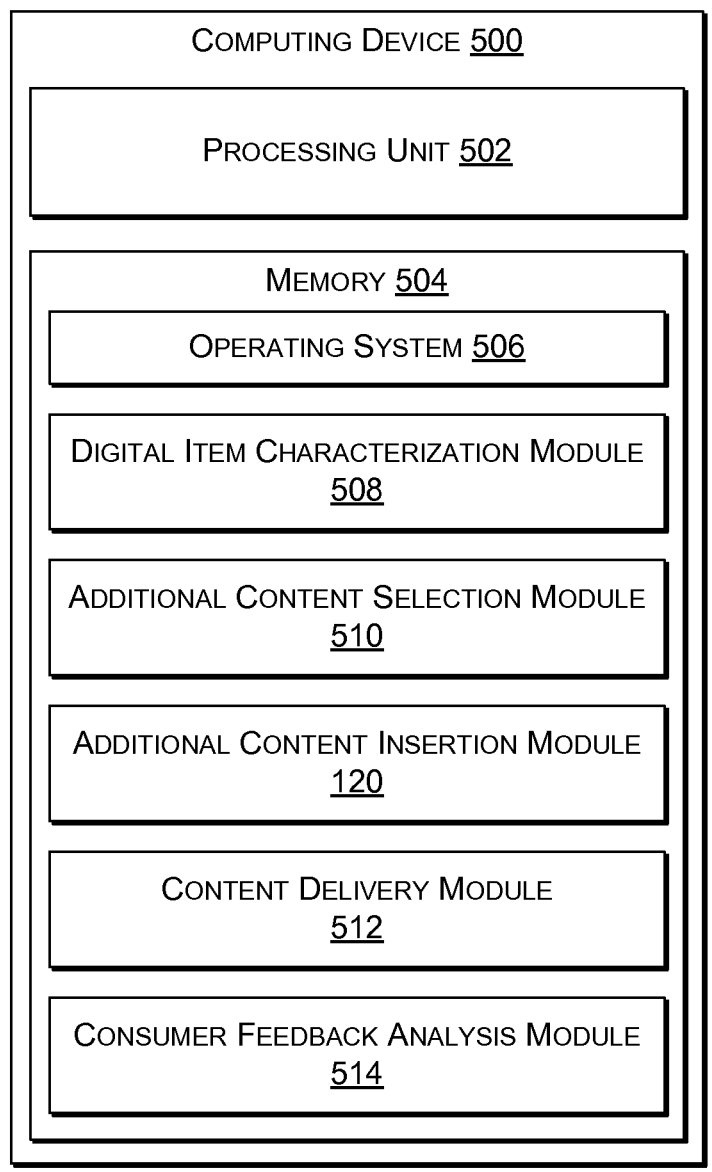
FIG. 5 is a schematic block diagram of a computing device, such as the computing device shown in FIG. 1. As illustrated, the computing device contains modules for inserting additional content into digital items.

FIG. 5 shows a schematic block diagram of a computing device 500 which may be the same or similar to the computing device 118 shown in FIG. 1. The computing device 500 includes one or more processors in a processing unit 502 and a memory 504. As discussed in detail below, the memory stores or otherwise has access to multiple modules and components, which may run as software in whole or in part on the computing device 500. The memory 504 may comprise volatile and/or nonvolatile memory, removable and/or non-removable media, and the like. Further, the memory 504 may be implemented in any method or technology for storage of information, such as computer-readable instructions, data structures, program modules, or other data. Such memory includes, but is not limited to, RAM, ROM, EEPROM, flash memory, CD-ROM, digital versatile disks (DVD) or other optical storage, magnetic cassettes, magnetic tape, magnetic disk storage or other magnetic storage devices, RAID storage systems, or any other tangible medium which can be used to store the desired information and which can be accessed by a computing device.

The memory 504 includes an operating system 506 for controlling interaction between the memory 504, processing unit 502, and hardware such as input-output devices and communication devices. The memory 504 may also include any number of modules to implement conventional computing device functionality such as security/encryption modules, data compression modules, and the like.

A digital item characterization module 508 stored in the memory 504 may characterize a level of interest throughout a temporal flow of a digital item. The level of interest may be characterized by collection direct and indirect feedback from one or more consumer in real-time while the consumers are consuming the digital item. The level of interest may be represented in a graph such as is shown in FIG. 2. The digital item characterization module 508 may aggregate indications of interest and disinterest from multiple consumers and calculate an interest value for multiple points along the temporal flow of the digital item.

An additional content selection module 510 stored in the memory 504 selects additional content for insertion into the digital item. The additional content may be selected based on a user profile of a consumer of the digital item. For example, if the user profile contains information about past purchases made by the consumer then an advertisement may be selected as the additional content based on the consumer's past purchases. A deleted scene or alternative scene may be selected for insertion into the digital item based on another characteristic of the consumer such as an indication of a type of scene that the consumer enjoys, a content rating level indicated by the consumer (or by a parent of the consumer), a preference for a longer or shorter digital item, or other characteristic.

The additional content selection module 510 may also select additional content based on a characteristic of the digital item. For example, an advertisement with a thematic or contextual relationship to the digital item may be selected for insertion as additional content (e.g., an advertisement to purchase a guitar inserted into a song played on that type of guitar). Similarly, an advertisement for a toy or children's product may be selected as the additional content for a children's television program.

Payment from an advertiser may also cause the additional content selection module 510 to select additional content indicated by the advertiser. In a relatively straightforward implementation, the advertiser that bids or pays a highest amount may choose to have its advertisement inserted as additional content. However, any other method or technique for competitive bidding (e.g., Dutch auction) or payment for advertisement placement (e.g., paying to block another advertiser from inserting advertisements) may also be used in conjunction with the additional content selection module 510.

An additional content insertion module 120 stored in the memory 504 inserts additional content within the temporal flow of the digital item. The additional content selection module 510 determines what is inserted into the digital item and the additional content insertion module 120 determines where the insertion is made.

The additional content may be inserted at a predetermined location based on the additional content itself. For example, a deleted scene may be inserted only at a particular location within the temporal flow of the digital item such as on page 10 line 45 of an eBook. Thus, once a particular deleted scene is selected by the additional content selection module 510, the identity of that deleted scene determines where the additional content insertion module 120 will make the insertion. The predetermined location may be associated with the additional content as metadata, a tag, or the like.

Certain advertisements, such as advertisements that benefit from consumer interaction with advertisement may specify a placement at certain locations within a digital item such as, for example, at the end of the digital item. Therefore, if an advertiser succeeds in having one of these types of advertisements inserted into the digital content item the insertion point will be a predetermined location determined by the advertisement. Other advertisements may be designed by an advertiser with a preference for passive consumption of the advertisement by the consumer. For these types of advertisements a preferred location may be at the beginning of the digital item such as a brief display (e.g., 2-3 seconds) of a brand logo before a movie or television show begins.

In other implementations, the additional content is inserted by the additional content insertion module 120 at a location determined by a characteristic of the consumer. The characteristic may be an advertising location preference of the consumer that is part of a user profile associated with the consumer. For example, the consumer may prefer to have model advertisements grouped together or advertisements spread out throughout the digital item. The consumer may also wish to have more advertisements towards the beginning of the digital item, towards the end of the digital item, in the middle of the digital item, etc. A given consumer's advertising location preference may be inferred from past feedback or responses to advertisements in other digital items and/or explicitly indicated by the consumer for example in response to a query about preferred advertisement locations.

In yet further implementations, the additional content insertion module 120 may insert additional content at a location determined by a characteristic of the digital item. For example, the characteristic of the digital item may be a level of interest throughout the temporal flow of the digital item and an advertisement may be inserted relative to the location of a portion having the highest interest.

A content delivery module 512 stored in the memory 504 makes the digital item including the additional content available to the consumer. In some implementations, a finalized or finished version of the digital item including inserted additional content may be prepared by the content delivery module 512. This may include creating a video, audio, text, or other type of file having the selected additional content inserted at the locations determined by the additional content insertion module 120. Thus, this "final product" may be consumable on electronic devices the same as other audio, visual, text, etc. files.

The content delivery module 512 may make the digital item available to one or more consumers by streaming the digital item over a network such as the network 108 shown in FIG. 1. The digital item may also be stored in the memory 504 and available for download from the computing device 500. Additionally, the content delivery module 512 may send the digital item to consumers who have subscribed (e.g., eBook of the month club) or otherwise indicated a desire to receive the digital item. The content delivery module 512 may also implement delivery of the digital item through any other technique for transferring digital content.

A consumer feedback analysis module 514 may also be present in the memory 504. The consumer feedback analysis module 514 may collect positive and/or negative feedback from consumers of digital items regarding placement of advertisements. Correlations between advertisement locations and characteristics of the digital item, the consumers, the advertisements, or other factors may be analyzed by the consumer feedback analysis module 514 using artificial intelligence and/or probabilistic analysis to identify locations within a content item for placement of advertisements. Preferred locations for placing advertisements may be those locations in which negative feedback is minimized and/or positive feedback is maximized.

Example Processes

Figure 6:
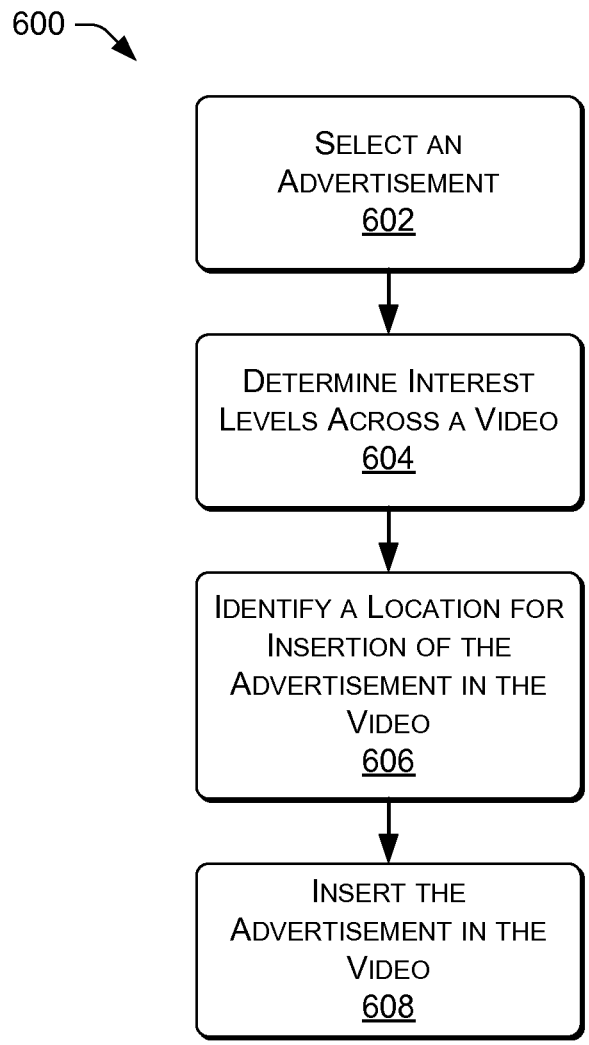
FIG. 6 is a flow diagram of an example process for inserting an advertisement in a video based on interest levels across the temporal flow of the video.
Figure 7:
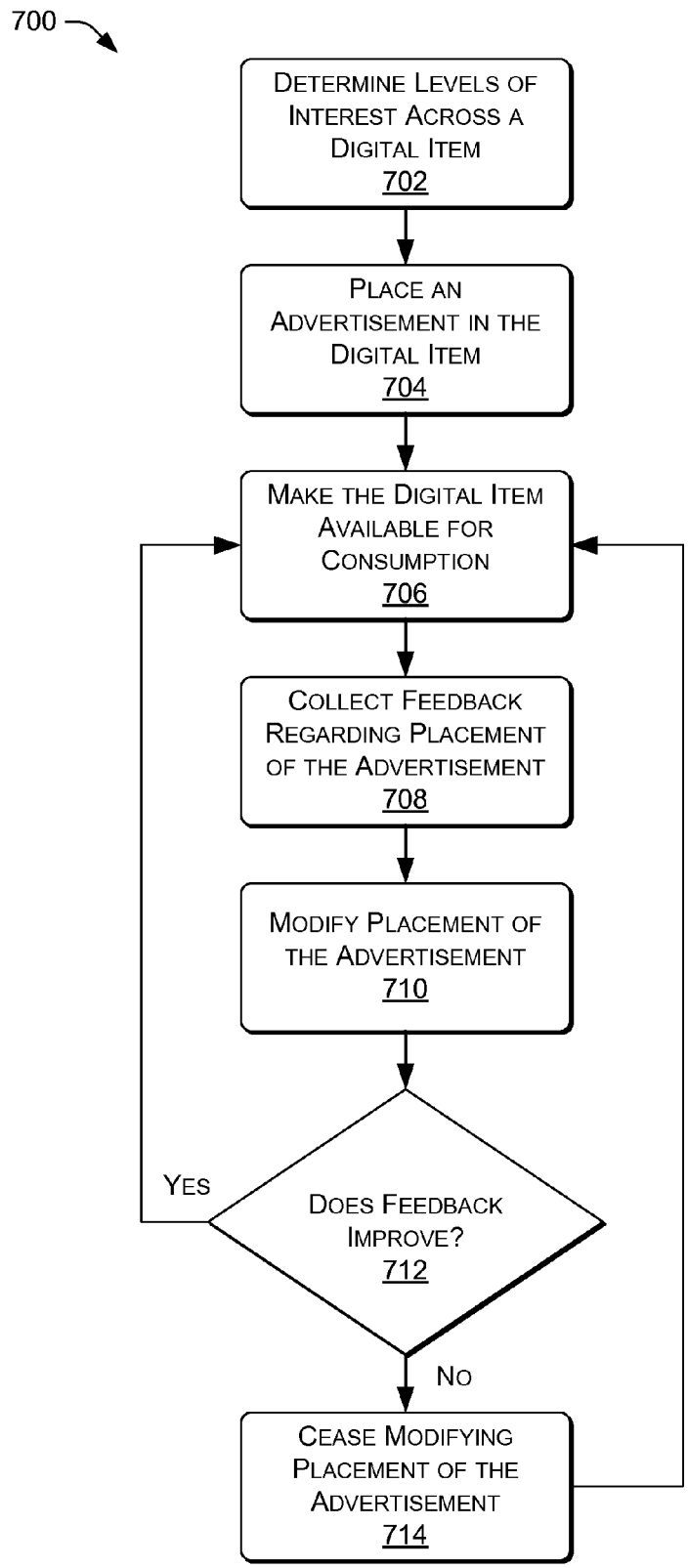
FIG. 7 is a flow diagram of an example process for iteratively improving placement of an advertisement in a digital item based on consumer feedback.
Figure 8:
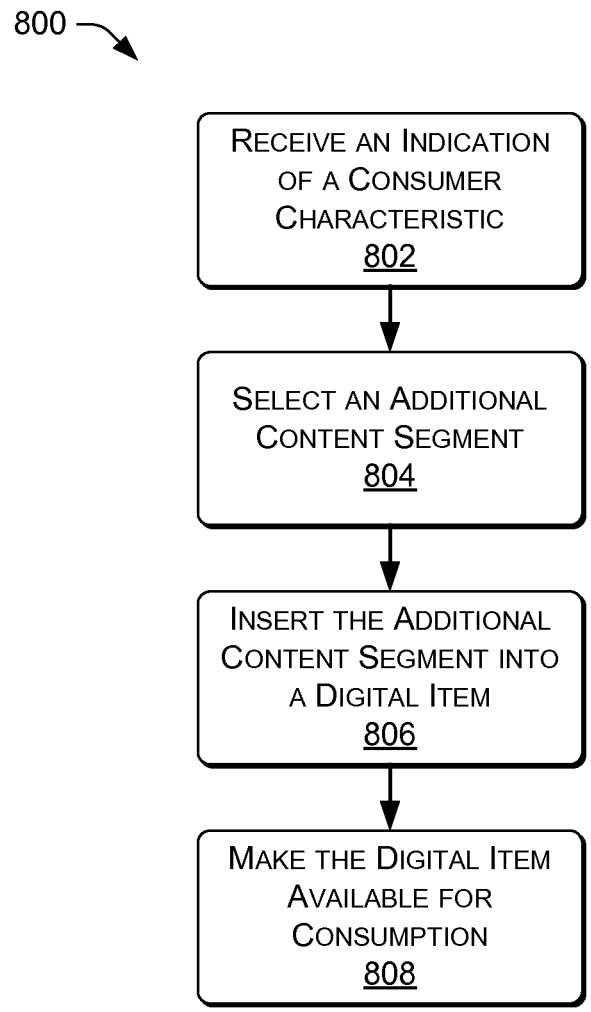
FIG. 8 is a flow diagram of an example process for inserting an additional content segment into a digital item based on a characteristic of a consumer who will consume that digital item.

FIGS. 6-8 are flow diagrams of example processes 600, 700, and 800 for modifying digital items with additional content. Each of these processes is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 6 illustrates process 600 for inserting an advertisement into a video based on a level of interest across a temporal flow of the video. At 602, an advertisement is selected. The advertisement may be selected by the additional content selection module 510 shown in FIG. 5. Selection of the advertisement may be based on a characteristic of the consumer, a characteristic of the video, and/or a payment from an advertiser.

At 604, relative levels of interest across the temporal flow of the video are determined based on real-time feedback from consumers while viewing the video. This determination may be performed by the digital item characterization module 508 shown in FIG. 5. The real-time feedback may include feedback explicitly provided by the consumers indicating how interested they are during various points throughout the video. Additionally or alternatively, the real-time feedback may also include implicit indicia of interest derived from physiological states or actions of the consumers while viewing the video. Some examples of implicit indicia that may suggest decreased or low interest in that portion of the video include an increase in frequency of input device activity, moving a window on a GUI displaying the video to the background or making that window a non-active window, and pausing or stopping playback of the video. The relative levels of interest from the start to the end of the video may be represented in a graph similar to the graph 300 shown in FIG. 2.

At 606, a location for insertion of the advertisement in the video is identified. The additional content insertion module 120 shown in FIGS. 1 and 5 may identify the location for insertion of the advertisement. The location for insertion of the advertisement may be based on relative levels of interest across a temporal flow of the video as determined at 604. The location may be relative to a point in the video having a highest level of interest. For example, the advertisement may be inserted shortly before or shortly after a part of the video that is determined to hold the highest interest for consumers. Therefore, consumers will likely sit through the advertisement because they are highly engaged by the video that point.

The location in which the advertisement is inserted may also be based on an advertising location preference of a consumer of the video. The advertising location preference may be a part of a profile associated with the consumer such as the user profile 106 shown in FIG. 1. The advertising location preference of the consumer may be based on data collected from direct or indirect feedback of the consumer regarding advertisement locations in other videos.

For example, if the consumer repeatedly provides negative feedback about advertisements that occur towards the end of other videos, advertisement locations for this consumer may be shifted towards the beginning of the video. Similarly, if the consumer provides positive feedback when advertisements are all grouped together at one location in a video, the advertising location preference of that consumer may be interpreted to indicate that advertisements should be grouped into as few blocks as possible. The direct feedback may include ratings of advertisements or expressions of acceptance/annoyance by the consumer when viewing an advertisement such as selection of a thumbs-up or thumbs-down icon. Indirect feedback may include things such as mouse or keyboard activity, eye movements, position of a window on a GUI displaying the video, and the like.

The advertising location preference of the consumer may also be based on advertising location preference of one or more of the consumers that have a characteristic in common with the consumer. For example, if the consumer has a list of favorite videos that are similar to a list of favorite videos for another consumer, it may be inferred that both consumers have similar preferences for advertisement locations. Any other characteristics may also be used as the basis for inferring a similarity in advertising location preference. Other types of characteristics may include, but are not limited to, age, gender, income, personality type, shopping history, and the like.

In some implementations, the location wherein the advertisement selected at 602 is inserted may be influenced by the location of a different advertisement. For example, similar advertisements may be grouped together or placed farther apart. This may also be considered together with the advertising location preference of the consumer for or against having multiple advertisements presented in a group.

Additionally, a payment from an advertiser may identify the location for insertion of the advertisement. If particular areas within the temporal flow the video are determined to be more desirable for advertising, then an advertiser paying a higher fee may be able to insert its advertisement at the most desirable locations. Advertisers may also wish to insert an advertisement at specific locations (e.g., the start, the end, etc.) of the digital item and may pay for the privilege of specifying where the advertisement is to be inserted.

At 608, the advertisement is inserted into the video at location identified in 606. The insertion may include splicing the advertisement into the temporal flow of the video. Insertion may also include coordinated streaming of the video and the advertisement from different locations so it appears to the consumer that the advertisement is present within the video. However, in some implementations, this result may be created by pausing streaming of the video and switching to the streamed advertisement then returning to the video stream once the advertisement is finished.

FIG. 7 illustrates process 700 for iteratively learning the "best" location for inserting an advertisement into a digital item. At 702, relative levels of interest across the temporal flow of the digital item are determined. This determination may be similar to that described in connection with FIG. 2 and/or the digital item characterization module 508.

At 704, the advertisement is placed within the temporal flow of the digital item. The initial placement may be at a randomly determined location. Alternatively, the location at which the advertisement is placed may be based on characteristics of the advertisement or of the digital item. For example, if previous advertisements placed in the same digital item have received the best feedback from consumers when placed after a point of highest interest (e.g., the climax of the story told by the digital item) the initial point of placement for this advertisement may also be shortly after the point of highest interest within the flow of the digital item.

At 706, the digital item including the advertisement is made available for consumption by a plurality of consumers. The digital item may be broadcast, narrowcast, streamed, e-mailed, uploaded, pushed, made available for downloading, or otherwise presented to multiple consumers. Out of the consumers that are eligible to receive and consume the digital item, some subset may elect to do so and also provide direct or indirect feedback about the combination of the digital item and the advertisement.

At 708, positive and/or negative feedback is collected from the plurality of consumers regarding placement of the advertisement. The customer or feedback analysis module 514 shown in FIG. 5 may collect and/or analyze all or part of the feedback. Even if every consumer dislikes the advertisement, it may be possible to discern where within the temporal flow of the digital item that dislike is relatively higher and relatively lower. Placing the advertisement wherein the dislike is relatively lower will provide the advertiser with the desired exposure while minimizing consumer discontent.

Both the positive and negative feedback may be provided explicitly or implicitly. One indication of positive feedback may be one or more of the plurality of consumers interacting with the advertisement. Interaction may involve clicking on the advertisement, selecting a link within the advertisement, and the like. Negative feedback may include direct and explicit negative feedback such as clicking a box that indicates dislike of the advertisement. Negative feedback may also be inferred from other activities during presentation of the advertisement such as increasing a frequency of input device activity, changing an active window of a graphical user interface (GUI) from the window containing the digital item to another window, pausing consumption of the digital item, or stopping consumption of the digital item.

At 710, placement of the advertisement within the digital item is modified based on the positive and/or negative feedback. The modifications may take effect for subsequent presentations of the digital item to the same or different consumers. For example, a movie that is available for on demand streaming may be presented with advertisements in different locations each time that movie is streamed to a consumer. Determining how to modify the insertion locations of the advertisements may be made by a system using machine intelligence, probabilistic analysis, or the like. Modifying placement of the advertisement may also include presenting the positive and negative feedback to a human editor and modifying placement of the advertisement based on instructions received from the human editor. The human editor may review the feedback and determine or make a best guess as to which alternative locations within the digital item for the advertisement would generate better feedback from the consumers.

The modification of placement of the advertisement, either by a machine or a human, may also be based on the relative levels of interest across the temporal flow of the digital item. For example, if placing an advertisement near a location in the digital item that has a high level of interest generates significant negative feedback, the location of the advertisement may be shifted to be near a region of low interest. Thus, trial and error is one way of determining correlations between a level of interest across the temporal flow of the digital item and the best placement location for an advertisement.

At 712, it is determined whether modifying placement of advertisement at 710 results in improved feedback from consumers of subsequent presentations of the digital item. For example, if the digital item is an eBook and a page of advertisement was moved from a first location to a second location within the eBook, feedback may be collected on a predetermined number of copies of the eBook with the advertisement and the second location. Thus, in one example, after 10,000 copies of the eBook with the modified advertisement placement have been downloaded, positive and/or negative feedback may be compared to previous feedback to determine whether or not there is an improvement.

If feedback does improve it may be inferred that the type of modification is positive and further modification of the same type or in the same direction (e.g., moving the advertisement closer to the end of the digital item) would lead to an even greater improvement in the feedback. Thus, process 700 may proceed along "yes" path from 712 and return to 706 and repeat 706, 708, and 710, until the positive feedback collected at 708 ceases to become more positive and/or the negative feedback collected 708 ceases to become less negative with further iterations. This iterative approach may identify a location within the temporal flow of the digital item that maximizes positive feedback and/or minimizes negative feedback to the advertisement. Thus, further modifications to the location of advertisement would cause the feedback to become worse.

Once the feedback ceases to become more positive and/or less negative with further iterations, process 700 may proceed from 712 along the "no" path to 714 and cease modifying placement of the advertisement. The inability to further improve feedback may suggest that an "optimal" or "best" location for the advertisement has been successfully identified.

Changing consumer preferences or a change in the consumer population (e.g. those who consume a digital item during the evening compared with those who consume the digital item late at night) may cause a previously "optimal" location to no longer be the best location for the advertisement. Similarly, a human editor, for example, may suspect that the placement of the advertisement while better than other locations within the digital item is not actually the optimal location. In either situation it may be necessary to restart the iterative process and see if an even better location can be identified for the advertisement. Thus process 700 may proceed from 714 and return to 706.

Although process 700 is described as placing a single advertisement, it is to be understood that the same or similar techniques may be used to identify locations for multiple advertisements within a single digital item. When multiple advertisements are placed into a single digital item the influence each advertisement has on the other advertisements may be considered to identify a combination of locations that maximizes positive feedback and/or minimizes negative feedback from the consumers across all of the advertisements.

FIG. 8 illustrates process 800 for inserting an additional content segment into a digital item. At 802, an indication of a characteristic of a consumer is received. The characteristic may include age, preferred content rating, preferred genre, preferred digital item length, advertising preference, or any other characteristic. In some implementations the characteristic of the consumer may be stored in a profile such as the user profile 106 shown in FIG. 1.

At 804, an additional content segment associated with the digital item is selected based on the characteristic of the consumer indicated at 802. The additional content segment may include a deleted scene showing an additional action sequence if, for example, the characteristic of the consumer indicates that he or she desires to view deleted scenes that contain action sequences. The additional content segment may also be one of a plurality of alternate scenes of which there are at least two versions. One of the versions of the alternate scene could be selected based on a preferred content rating level of the consumer. A particular scene in a movie may have three versions one rated G, one rated PG 13, and one rated R. The selected version may be the one that matches the preferred content rating level of the consumer. Additionally, the additional content segment may be an advertisement. The advertisement may be selected based on the advertising preference of the consumer, for example, if the consumer prefers to consume advertisements about vacation opportunities and travel, the additional constant segment may be an advertisement for a cruise.

At 806, the additional content segment is inserted into the temporal flow of the digital item. In some implementations, the additional content segment may be inserted at a predetermined location. The predetermined location may be associated with the content segment. For example, a given deleted scene from a movie may be inserted at a particular time point within the movie such as 45 minutes and 2 seconds after the start of the movie. The creator of the movie (e.g., director) may specify the order of the scenes and thus specify the predetermined location of this deleted scene as being 45 minutes and 2 seconds into the movie.

For other types of additional content segments such as advertisements, the advertiser may determine the predetermined location into which the additional content item is inserted. For example, an advertiser may specify that an advertisement is to be inserted at the start of the digital item. The advertiser may, of course, specify any predetermined location within the temporal flow of the digital item.

At 808, the digital item including the additional content segment is made available for consumption by the consumer. The digital item may be made available to streaming, downloading, or any other technique for sharing or transmitting digital content. The content delivery module 512 shown in FIG. 5 may function to make the digital item available for consumption by the consumer.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method comprising:
receiving, via one or more computing devices, a video that includes a plurality of locations in a temporal flow of the video;
receiving, via at least one of one or more computing devices, a characterization of the video that associates individual ones of the plurality of locations with a respective interest level of a plurality of interest levels, wherein an interest level indicates a degree of consumer interest in a respective location of the video, wherein at least one interest level associated with at least one location of the plurality of locations comprises implicit indicia of interest derived from actions of consumers while viewing the video, wherein the implicit indicia of interest comprises a frequency of an input device activity of one or more input devices, wherein an increased frequency of the input device activity indicates a decrease of the at least one interest level;
selecting, via at least one of one or more computing devices, an advertisement to insert into the video;
identifying, via at least one of one or more computing devices, an interest location of the plurality of locations based at least in part on the characterization of the video;
selecting an insertion location for the advertisement, the insertion location being within a predetermined temporal distance from the interest location identified based at least in part on the characterization of the video; and
inserting, via at least one of one or more computing devices, the advertisement in the insertion location.

2. The method of claim 1, wherein the characterization of the video is included in the video.

3. The method of claim 1, wherein selecting the insertion location of the plurality of locations for insertion of the advertisement is further based at least in part on an advertising location preference of a consumer of the video.

4. The method of claim 3, wherein the advertising location preference of the consumer is based at least in part on an advertising location preference of another consumer having at least one characteristic in common with the consumer.

5. The method of claim 1, wherein identifying the interest location of the plurality of locations is based at least in part on at least one of the plurality of locations in the temporal flow of the video being associated with a highest level of interest, a location of another advertisement in the temporal flow of the video, or a payment from an advertiser.

6. The method of claim 1, wherein the implicit indicia of interest further comprise a correspondence between an active window of a graphical user interface (GUI) and a window of the GUI containing the video.

7. The method of claim 1, wherein the one or more input devices comprises at least one of a keyboard or a mouse.

8. A non-transitory computer-readable storage medium having stored therein instructions, which when executed by a processor, cause one or more processors to perform acts comprising:
accessing a video that includes a plurality of locations in a temporal flow of the video;
accessing a characterization of the video that associates individual ones of the plurality of locations with an interest level, wherein the interest level indicates consumer retention associated with continued consumption of the video;
selecting an advertisement;
identifying a location of the plurality of locations for insertion of the advertisement based at least in part on the characterization of the video, wherein identifying the location of the plurality of locations for insertion of the advertisement is based at least in part on the location identified being associated with an interest level having a minimum change in the indicated consumer retention; and
inserting the advertisement in the location identified based at least in part on the characterization of the video.

9. The medium of claim 8, wherein selecting the advertisement is based at least in part on at least one of a characteristic of a consumer, a characteristic of the video, or a payment from an advertiser.

10. The medium of claim 8, wherein identifying the location of the plurality of locations for insertion of the advertisement is further based at least in part on an advertising location preference of a consumer of the video.

11. The medium of claim 10, wherein the advertising location preference of the consumer is based at least in part on data collected from direct or indirect feedback from the consumer regarding advertisement locations in other videos or an advertising location preference of another consumer having at least one characteristic in common with the consumer.

12. The medium of claim 8, wherein at least one interest level associated with at least one location of the plurality of locations comprises implicit indicia of interest derived from actions of the plurality of consumers while viewing the video.

13. The medium of claim 8, wherein the implicit indicia of interest comprise a correspondence between an active window of a graphical user interface (GUI) and a window of the GUI containing the video.

14. A media player comprising:

one or more processors;

a network interface;

a non-transitory computer readable storage medium having stored therein instructions, which when executed by the one or more processors, cause the media player to perform acts comprising:

accessing a video that includes a plurality of locations in a temporal flow of the video;

accessing a characterization of the video that associates individual ones of the plurality of locations with a corresponding interest level of a plurality of interest levels, wherein an interest level associated with a corresponding location of the video indicates consumer retention associated with continued consumption of the video at the corresponding location of the video, wherein at least one interest level associated with at least one location of the plurality of locations comprises implicit indicia of interest derived from actions of consumers while viewing the video, wherein the implicit indicia of interest comprise a size of a window of a GUI containing the video such that a decrease in the size of the window of the GUI containing the video indicates a decrease of the at least one interest level;

identifying a location of the plurality of locations for insertion of an advertisement based at least in part on the characterization of the video; and inserting the advertisement in the location identified based at least in part on the characterization of the video.

15. The media player of claim 14, further comprising selecting the advertisement based at least in part on at least one of a characteristic of a consumer, a characteristic of the video, or a payment from an advertiser.

16. The media player of claim 14, wherein identifying the location of the plurality of locations for insertion of the advertisement is further based at least in part an advertising location preference of a consumer of the video.

17. The media player of claim 16, wherein the advertising location preference of the consumer is based at least in part on data collected from direct or indirect feedback from the consumer regarding advertisement locations in other videos, the data collected while viewing an advertisement.

18. The media player of claim 14, wherein identifying the location of the plurality of locations for insertion of the advertisement is based at least in part on at least one of the location identified having a highest level of interest, a location of another advertisement in the temporal flow of the video, or a payment from an advertiser.

19. The media player of claim 14, further comprising at least one of a keyboard or a mouse, wherein the implicit indicia of interest further comprises a frequency of input device activity of the at least one of the keyboard or the mouse.

\* \* \* \* \*